US007950883B2

(12) United States Patent
Chen

(10) Patent No.: US 7,950,883 B2
(45) Date of Patent: May 31, 2011

(54) COMPACT ENGRAVING MACHINE

(76) Inventor: Yuehting Chen, Taichung County (TW)

( * ) Notice: Subject to any disclaimer, the term of this patent is extended or adjusted under 35 U.S.C. 154(b) by 787 days.

(21) Appl. No.: 12/068,141

(22) Filed: Feb. 4, 2008

(65) Prior Publication Data

US 2009/0196703 A1 Aug. 6, 2009

(51) Int. Cl.
*B23C 1/08* (2006.01)

(52) U.S. Cl. ........ 409/202; 409/134; 409/145; 409/191; 409/235

(58) Field of Classification Search .................. 409/109, 409/145, 159, 172, 185, 190, 191, 202, 134, 409/219, 235, 236; *B23C 1/08*
See application file for complete search history.

(56) References Cited

U.S. PATENT DOCUMENTS

| | | | | | |
|---|---|---|---|---|---|
| 136,800 | A * | 3/1873 | Williamson | .................. | 409/202 |
| 3,895,559 | A * | 7/1975 | Hoffman | ....................... | 409/188 |
| 4,339,857 | A * | 7/1982 | Dickinson | ..................... | 29/26 A |
| 4,561,814 | A * | 12/1985 | Dahlgren et al. | ............... | 409/80 |
| 5,116,174 | A * | 5/1992 | Fried et al. | ....................... | 409/79 |
| 5,451,126 | A * | 9/1995 | Brun | ............................. | 408/1 R |
| 6,254,075 | B1 * | 7/2001 | Kozima | .......................... | 269/73 |
| 6,409,642 | B2 * | 6/2002 | Tominaga et al. | .............. | 483/16 |
| 7,216,003 | B2 * | 5/2007 | Faulkner et al. | ................ | 700/26 |

FOREIGN PATENT DOCUMENTS

JP 60085840 A * 5/1985

* cited by examiner

*Primary Examiner* — Daniel W Howell

(57) ABSTRACT

An engraving machine includes a base with two side panels extending upward from two sides of the base, and a top board is driven horizontally by a motor in the base. A horizontal frame is movably mounted on two rods connected between the two side panels by a motor. A vertical frame is located on a front side of the horizontal frame and is movable along two rods in vertical direction by another motor. The horizontal frame, the vertical frame and the top board are movable along X, Y and Z directions by three independent motors. A chuck is connected to the vertical frame and secures an engraving tool which is driven by a main motor connected between the two side panels. The object to be engraved is secured on the top board and engraved by the engraving tool in X, Y and Z directions.

4 Claims, 8 Drawing Sheets

COMPACT ENGRAVING MACHINE

BACKGROUND OF THE INVENTION (1) Field of the Invention

The present invention relates to a compact engraving machine which is connected with a personal computer and the engraving tool can be operated in X, Y and Z directions.

(2) Description of the Prior Art

A conventional engraving machine is a huge machine which is connected with special software run by a specific computer. The conventional engraving machine can only be operated skilled persons so as to engrave huge items. The conventional engraving machine is expensive so that most of the businesses can not afford to have their own engraving machines.

The present invention intends to provide a compact engraving machine which is connected with a personal computer and can be put on a table so that any person can afford the engraving machine of the present invention.

Besides, the compact engraving machine includes three independent motors to control the movement of the engraving tool along X, Y and Z directions.

SUMMARY OF THE INVENTION

The present invention relates to an engraving machine which comprises a base with two side panels extending upward from two sides of the base and a first motor is located in the base and drives a first belt. A first block is connected to the first belt and a top board is connected to the first block and has two first slide members connected to an underside thereof. Two first slide rods are connected to two opposite ends of the base and the two slide members are movably mounted to the two first slide rods. A horizontal frame has two second slide members which are movably mounted to two second rods connected between the two side panels. A first plate is connected between the two side panels and a second motor is connected to the first plate. The second motor drives a second belt and a second block is connected to the second belt. The horizontal frame is connected to the second block which drives the horizontal frame to move horizontally. A vertical frame is connected to a front side of the horizontal frame and a third motor is connected to the vertical frame. The third motor drives a third belt and a third block is connected to the third belt. The vertical frame is connected to the third block. Two third rods are located in the horizontal frame and two third slide members are connected to the vertical frame. The third slide members are movably mounted to the two third rods so that the vertical frame moves along the two third rods. A chuck is connected to the vertical frame and an engraving tool is secured to the chuck. A main motor is connected between the two side panels and includes a transmission hose which is connected to the engraving tool.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
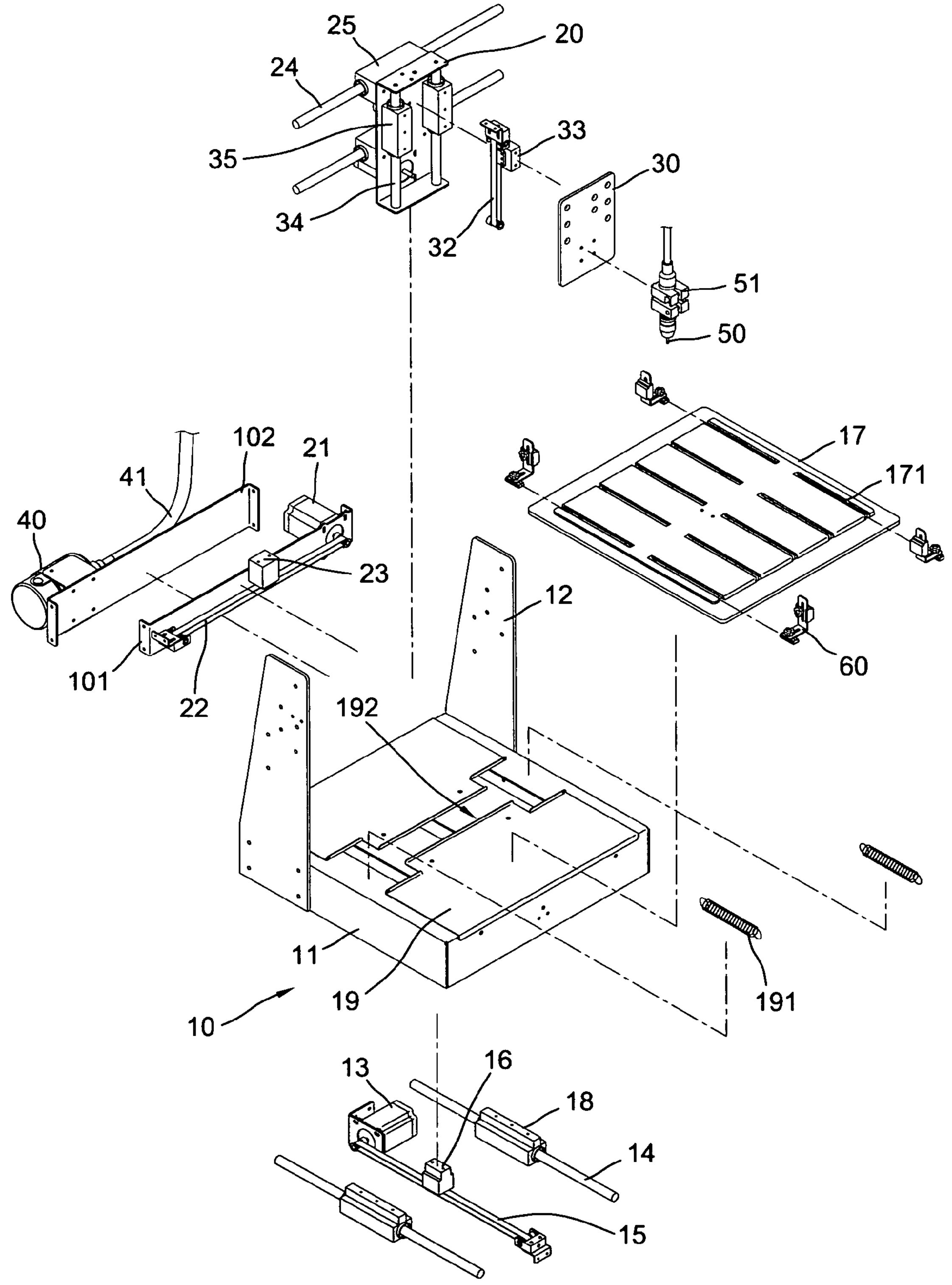
FIG. 1 is an exploded view to show the engraving machine of the present invention.
Figure 2:
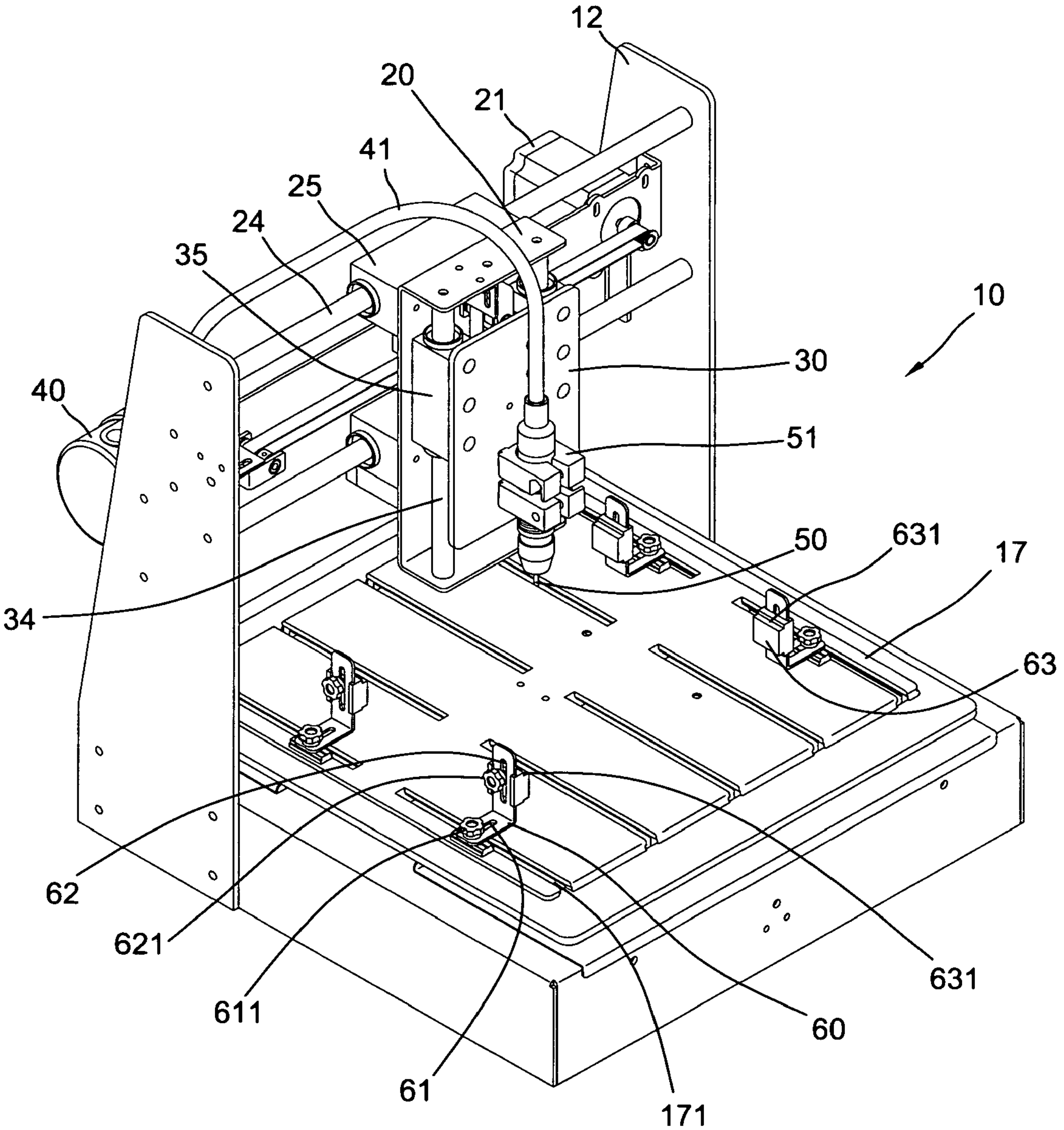
FIG. 2 is a perspective view to show the engraving machine of the present invention.
Figure 3:
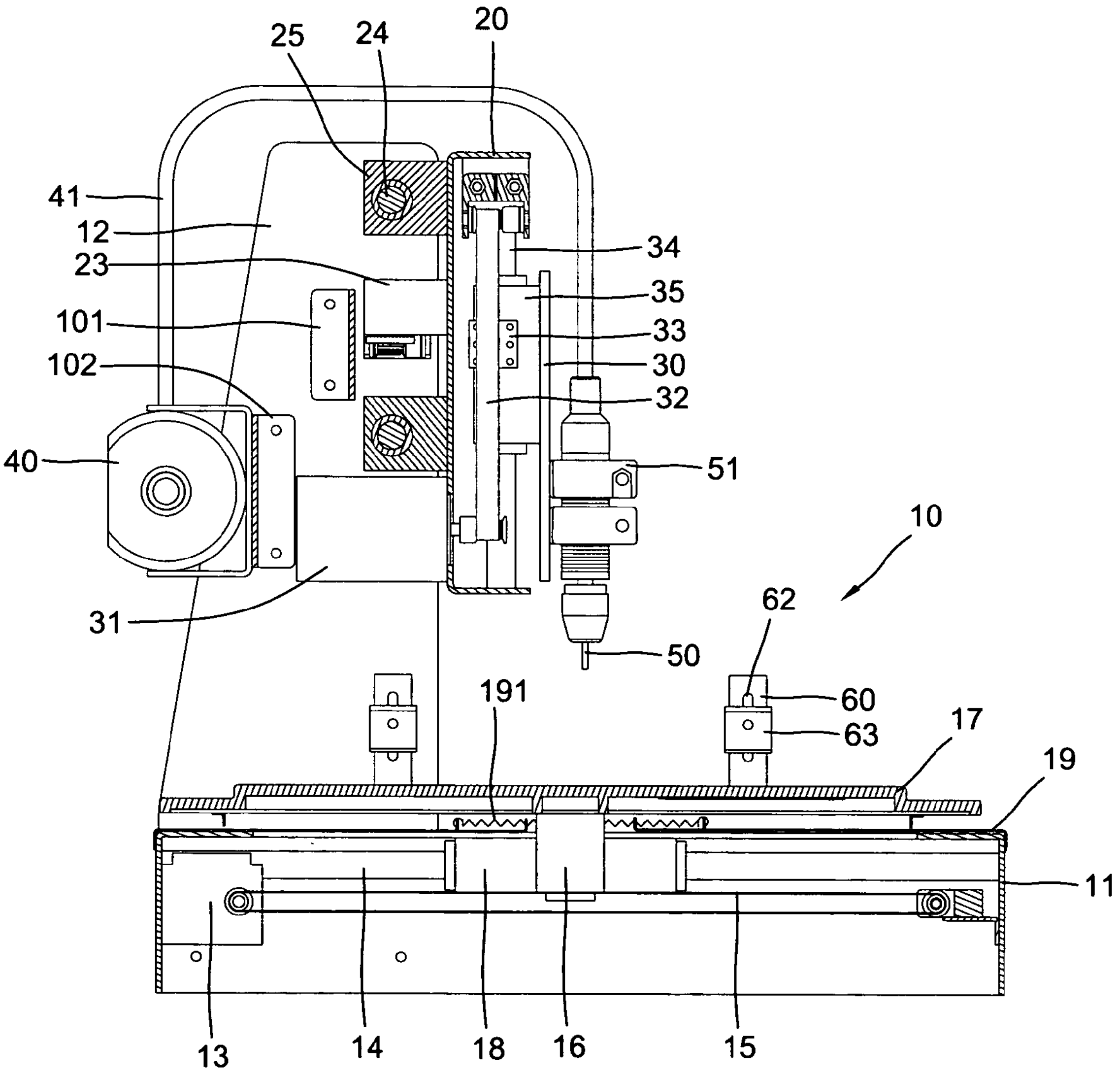
FIG. 3 is a side and partial cross sectional view of the engraving machine of the present invention.
Figure 4:
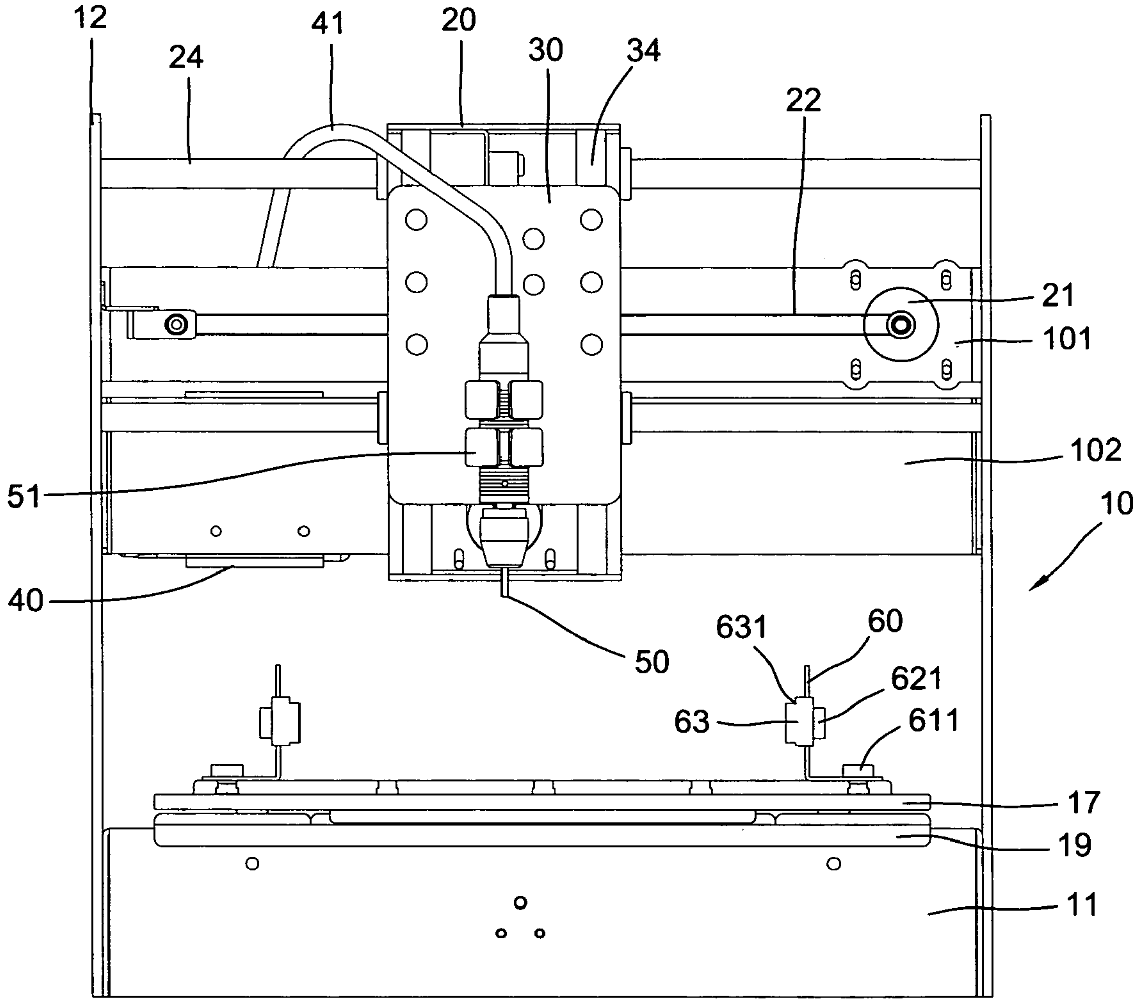
FIG. 4 is a front view of the engraving machine of the present invention.
Figure 5:
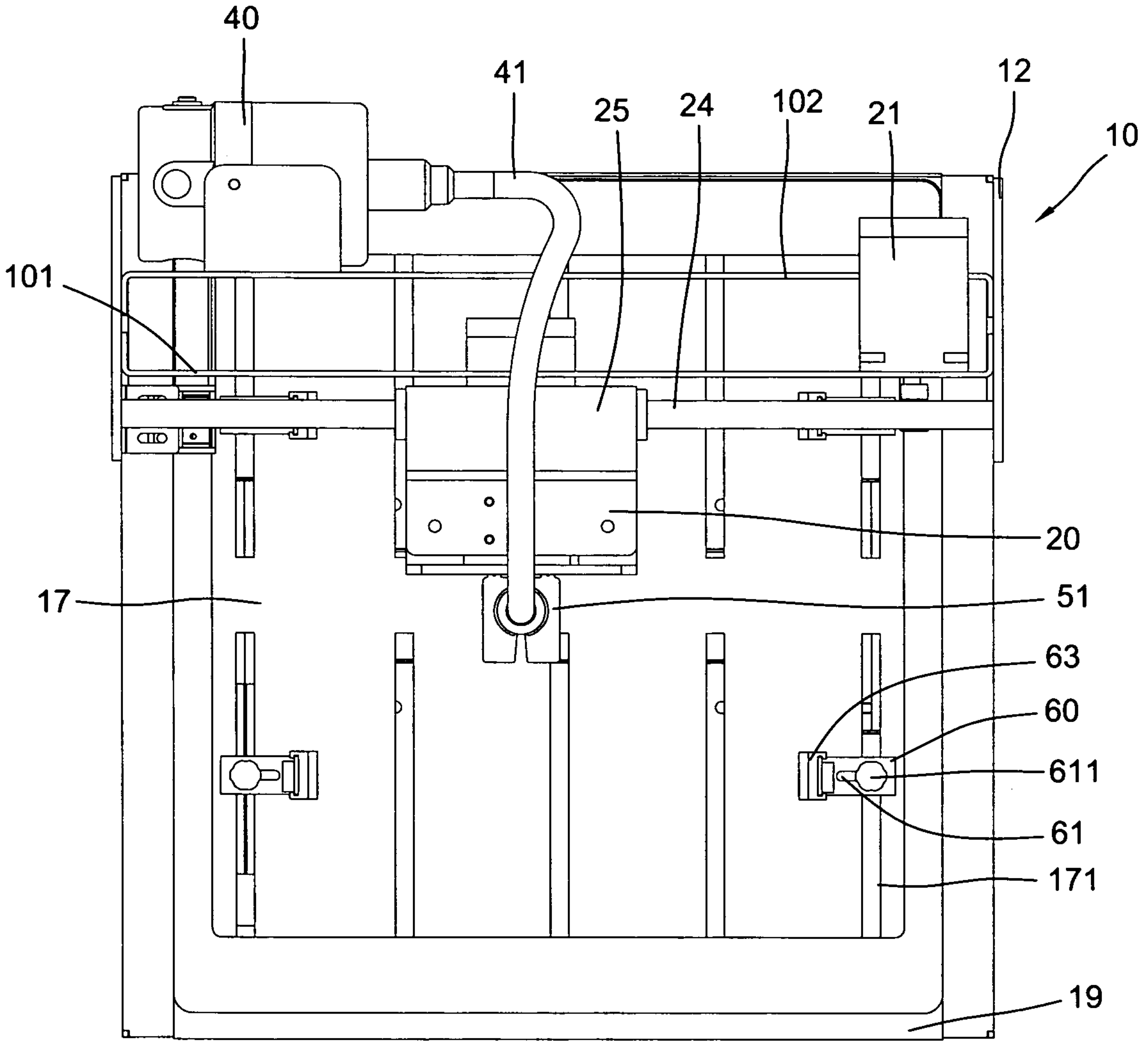
FIG. 5 is a top view of the engraving machine of the present invention.

Referring to FIGS. 1 to 5, the compact engraving machine 10 of the present invention comprises a base 11 and two side panels 12 extend upward from two sides of the base 11. A first motor 13 is located in the base 11 and drives a first belt 15 to which a first block 16 is connected. Two first slide rods 14 are connected to two opposite ends of the base 11 and located parallel to the first belt 15. A top board 17 is connected to the first block 16 and includes two first slide members 18 which are connected to an underside of the top board 17. The two slide members 18 are movably mounted to the two first slide rods 14.

A horizontal frame 20 includes two second slide members 25 which are movably mounted to two second rods 24 connected between the two side panels 12. A first plate 101 is connected between the two side panels 12 and a second motor 21 is connected to the first plate 101. The second motor 21 drives a second belt 22 and a second block 23 is connected to the second belt 22. The horizontal frame 20 is connected to the second block 23 which drives the horizontal frame 20 to move horizontally.

A vertical frame 30 is located on a front side of the horizontal frame 20 and a third motor 31 is connected to the vertical frame 30. The third motor 31 drives a third belt 32 and a third block 33 is connected to the third belt 32. The vertical frame 30 is connected to the third block 33. Two third rods 34 are located in the horizontal frame 20 and two third slide members 35 are connected to the vertical frame 30. The third slide members 35 are movably mounted to the two third rods 34 so that the vertical frame 30 moves along the two third rods 34 when the third motor 31 is activated.

A chuck 51 is connected to the vertical frame 30 and an engraving tool 50 is secured to the chuck 51. A second plate 102 is connected between the two side panels 12 and a main motor 40 is connected to the second plate 102. The main motor 40 includes a transmission hose 41 which is connected to the engraving tool 50.

Two dust covers 19 are movably connected to the base 11 and located beneath the top board 17. Two springs 191 are connected between the two dust covers 19 and a gap 192 is defined between the two dust covers 19, the first slide members 18 and the first block 16 are movable within the gap 192.

The top board 17 includes a plurality of positioning holes 171 and a plurality of clamping members 60 are engaged with the positioning holes 171. Each clamping member 60 is an L-shaped plate and includes horizontal and vertical portions. Slots 61, 62 are defined in the horizontal and vertical portions. Bolts 611 extend through the slots 61 in the horizontal portions to position the clamping members 60 to the top board 17 and bolts 62 extend through the slots 62 in the vertical portions to be connected to holding blocks 63. The holding blocks 63 can be moved to desired positions by the bolts 611. Each holding block 63 includes stepped portion 631 which is designed to hold an object.

Figure 6:
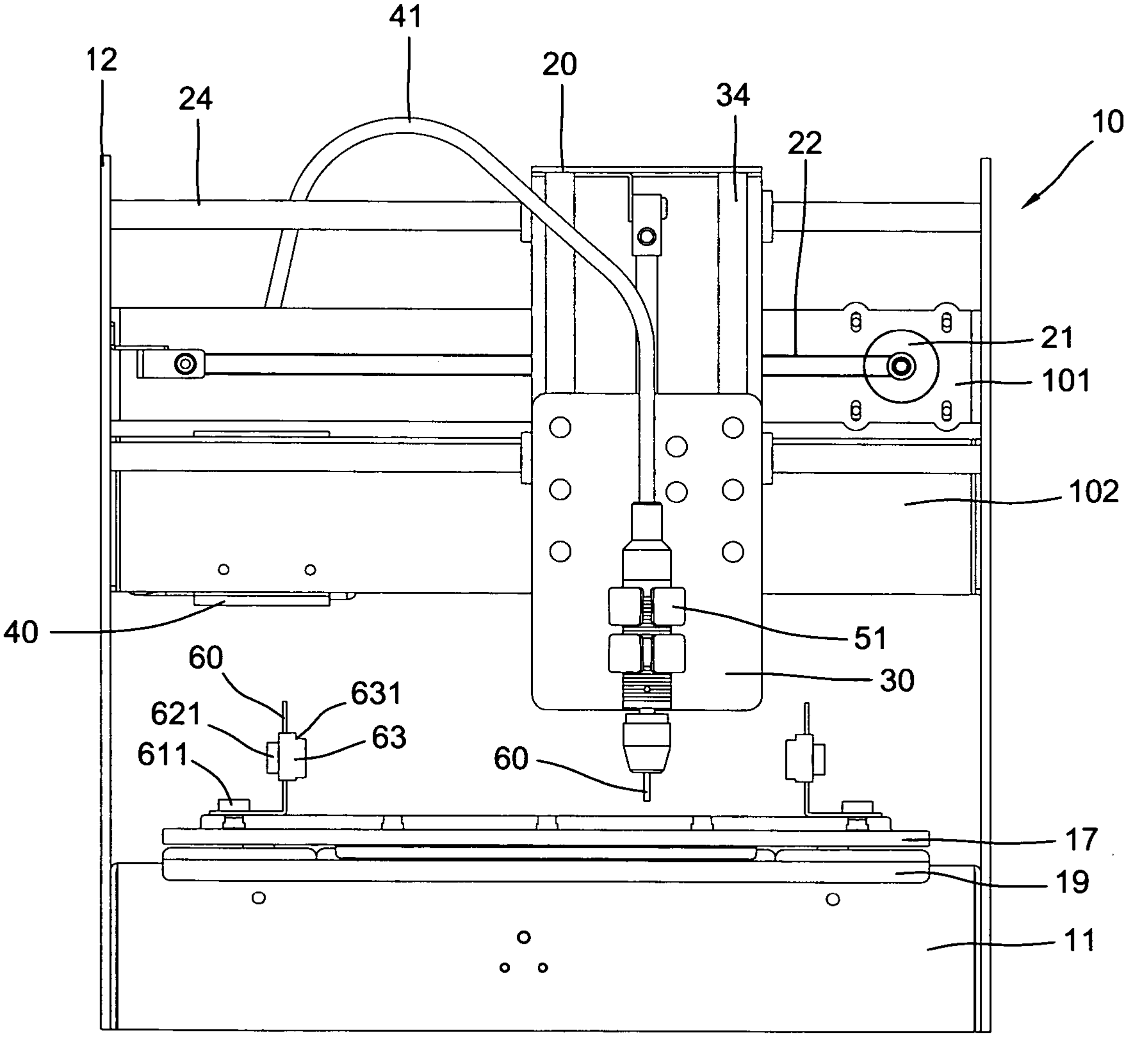
FIG. 6 shows that the horizontal frame and the vertical frame are operated.
Figure 7:
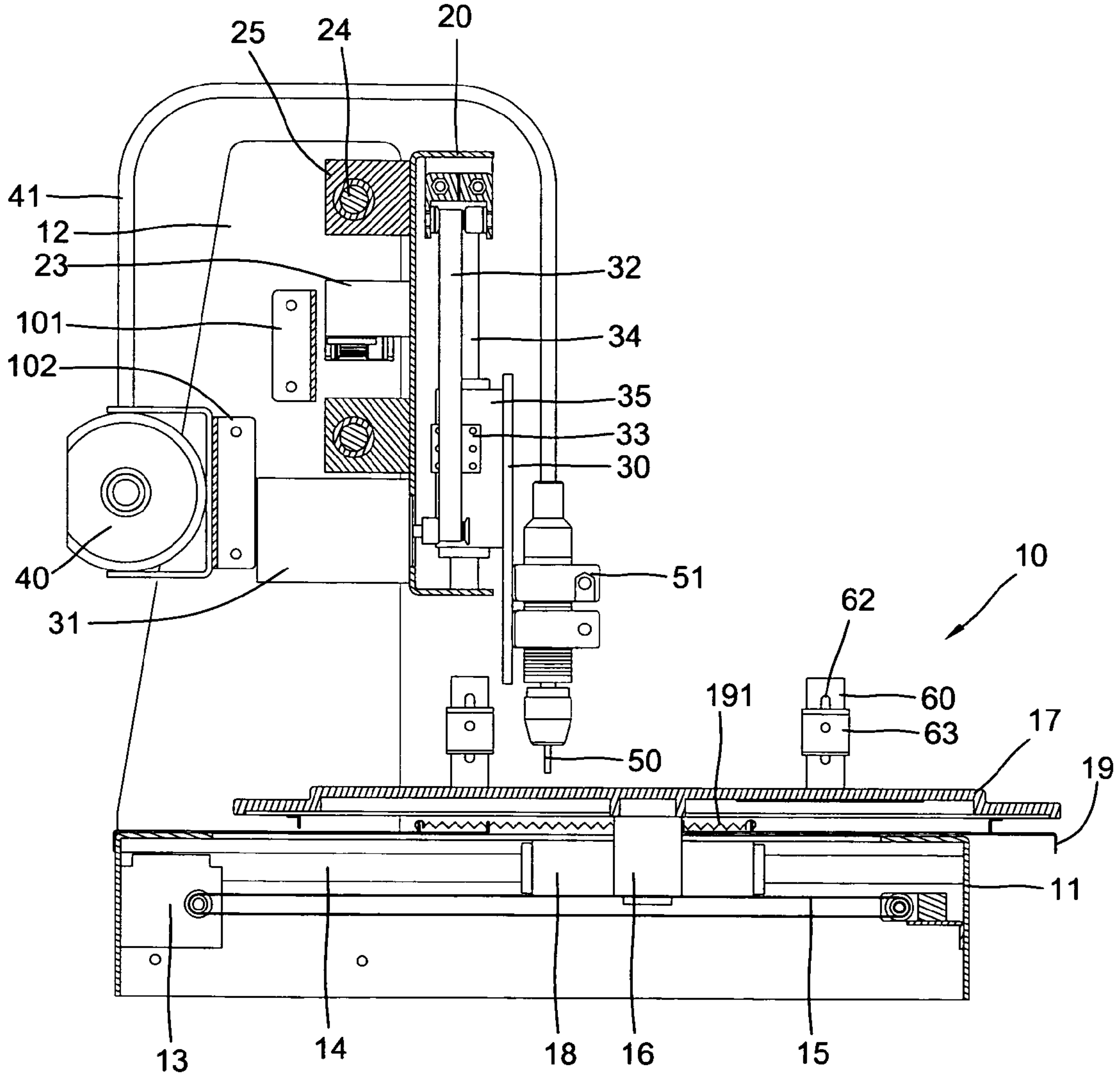
FIG. 7 is a side cross sectional view of the status of the engraving machine in FIG. 6.
Figure 8:
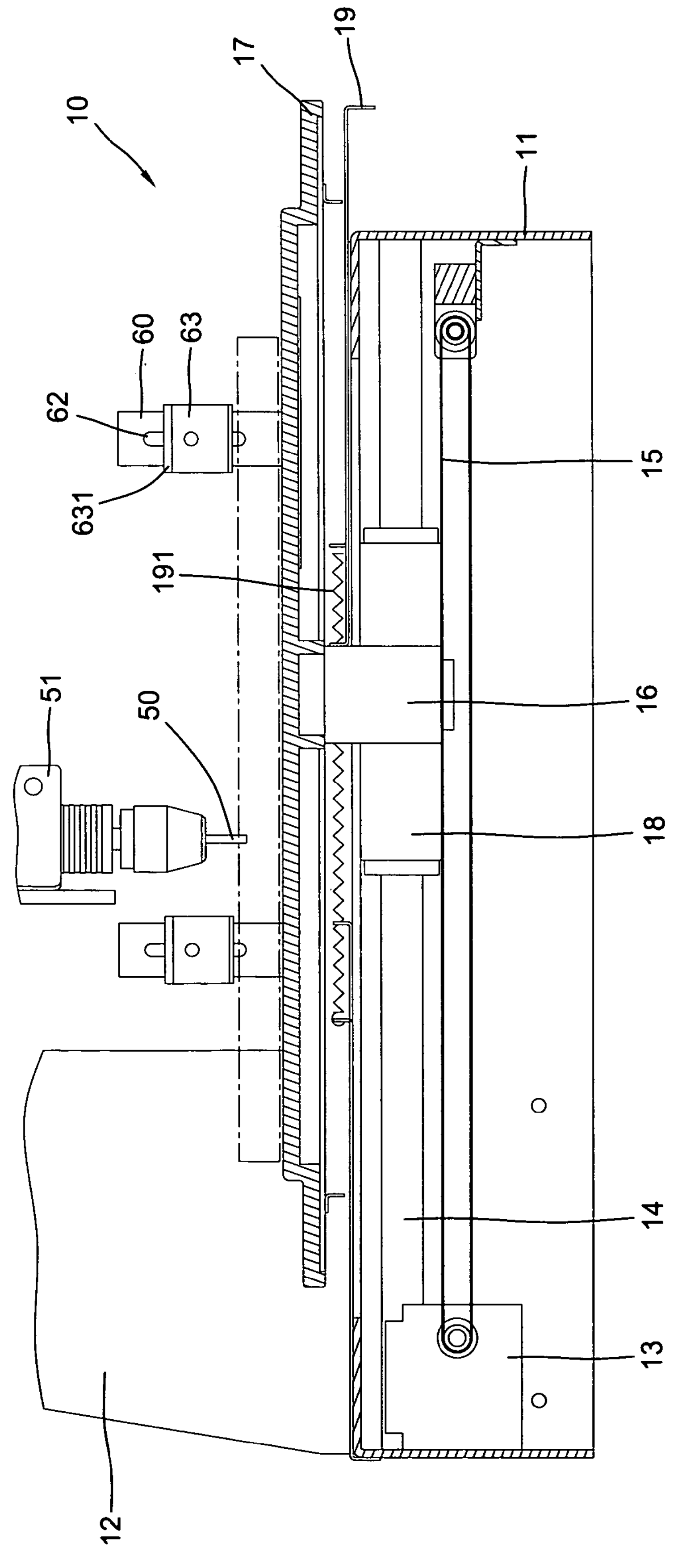
FIG. 8 is a partial cross sectional view to show the base and the top board of the engraving machine.

As shown in FIGS. 6 to 8, the object to be engraved is supported and positioned by the holding blocks 63 and the top board 17 can be moved in Y direction by the first motor 13, the horizontal frame 20 is movable in X direction by the second motor 21 and the vertical frame 30 is movable in Z direction by the third motor 33.

The springs 191 connected between the two dust covers 19 maintain the relative positions of the two dust covers 19 such that the gap 192 is adjusted. By the adjustment of the gap 192, when one dust cover 19 is shifted, the other dust cover 19 moves toward the moved dust cover 19 by the springs 191 so as to prevent dust from entering the base 11.

The compact engraving machine 10 is operated by a personal computer and can be put on a table.

While we have shown and described the embodiment in accordance with the present invention, it should be clear to those skilled in the art that further embodiments may be made without departing from the scope of the present invention.

What is claimed is:

1. An engraving machine comprising:

a base with two side panels extending upward from two sides of the base, a first motor located in the base and driving a first belt to which a first block is connected, a top board connected to the first block and having two first slide members connected to an underside thereof, two first slide rods connected to two opposite ends of the base and the two slide members movably mounted to the two first slide rods;

a horizontal frame having two second slide members which are movably mounted to two second rods connected between the two side panels, a first plate connected between the two side panels and a second motor connected to the first plate, the second motor driving a second belt and a second block connected to the second belt, the horizontal frame connected to the second block which drives the horizontal frame to move horizontally;

a vertical frame located on a front side of the horizontal frame and a third motor connected to the vertical frame, the third motor driving a third belt and a third block connected to the third belt, the vertical frame connected to the third block, two third rods located in the horizontal frame and two third slide members connected to the vertical frame, the third slide members movably mounted to the two third rods so that the vertical frame moving along the two third rods;

a chuck connected to the vertical frame and an engraving tool secured to the chuck, a main motor connected between the two side panels and including a transmission hose which is connected to the engraving tool, and the top board movable in Y direction and the horizontal frame movable in X direction and the vertical frame movable in Z direction.

2. The engraving machine as claimed in claim 1, wherein two dust covers are movably connected to the base and located beneath the top board, two springs connected between the two dust covers and a gap is defined between the two dust covers, the first slide members and the first block are movable within the gap.

3. The engraving machine as claimed in claim 1, wherein a second plate is connected between the two side panels and the main motor is connected to the second plate.

4. The engraving machine as claimed in claim 1, wherein the top board includes a plurality of positioning holes and a plurality of clamping members are engaged with the positioning holes, each clamping member is an L-shaped plate and slots are defined in horizontal and vertical portions thereof, bolts extend through the slots in the horizontal portions to position the clamping members to the top board and bolts extend through the slots in the vertical portions to be connected to holding blocks, each holding block includes stepped portion which is adapted to hold an object.

* * * * *